June 1, 1943. C. L. JOHNSON 2,320,870
ANTI-ICING DUCT
Filed Sept. 20, 1940 2 Sheets-Sheet 1
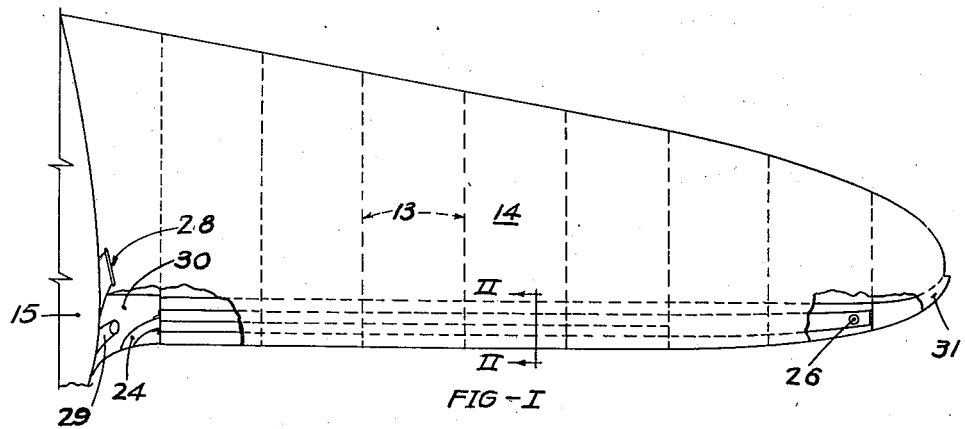
FIG-I
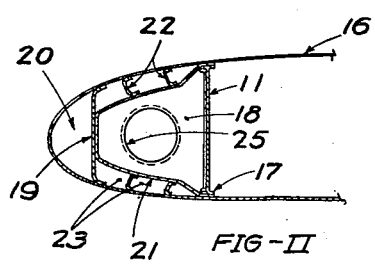
FIG-II
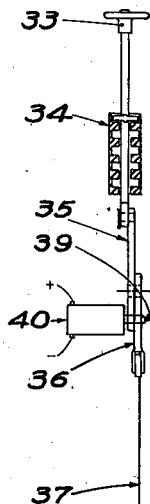
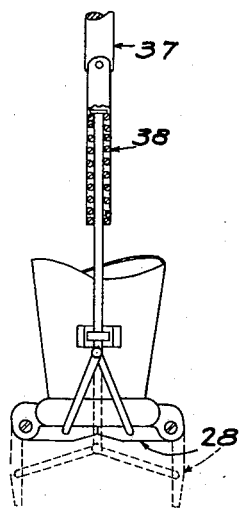
FIG-IV
FIG-V
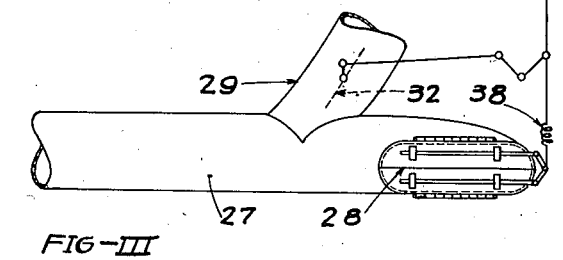
FIG-III
INVENTOR
Clarence L. Johnson June 1, 1943.  C. L. JOHNSON  2,320,870
ANTI-ICING DUCT
Filed Sept. 20, 1940   2 Sheets-Sheet 2
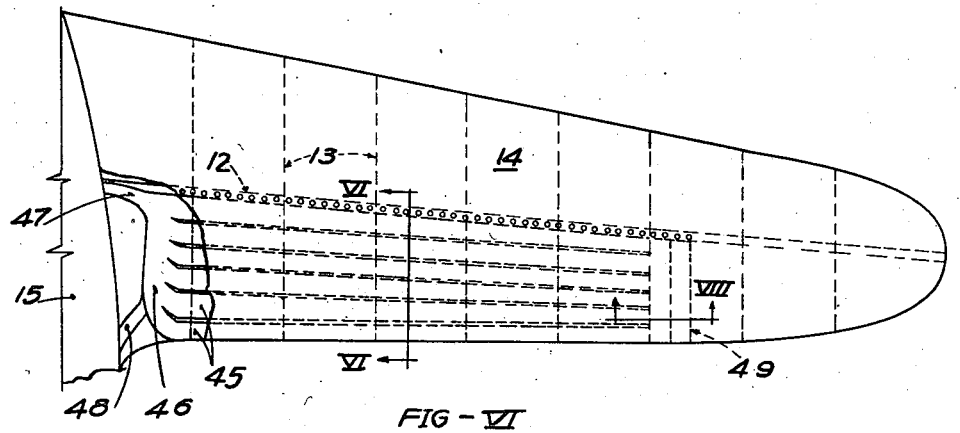
FIG-VI
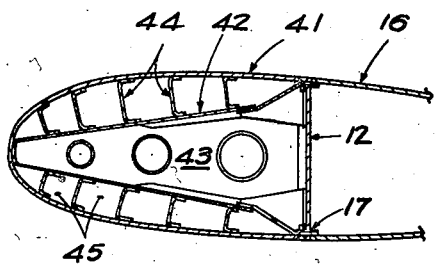
FIG-VII
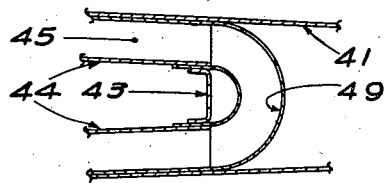
FIG-VIII
INVENTOR
Clarence L. Johnson Patented June 1, 1943

2,320,870

UNITED STATES PATENT OFFICE 2,320,870

ANTI-ICING DUCT

Clarence L. Johnson, Burbank, Calif., assignor to Lockheed Aircraft Corporation, Burbank, Calif.

Application September 20, 1940, Serial No. 357,539

6 Claims. (Cl. 244—134)

This invention relates to improved anti-icing arrangements for airplane wings and the like, and contemplates the utilization of the heat of either engine exhaust gas or highly heated air on its way from a supercharger to the engine.

I am aware that previous attempts have been made to utilize engine exhaust gases for this purpose, and that inter or after coolers have been used for compressed air; but in aircraft work, no system other than pulsating rubber boots has survived the test of use as a anti-icer. A rubber boot installation on a conventional transport airplane may cost several thousand dollars and last but a year or two. The extra weight penalizes the payload capacity of the airplane to such an extent that it is common practice to take a chance in summer by removing the boots. By means of a new and improved construction I have been enabled to provide exhaust or hot air passages in the nose section of the wing, which passages are formed by structural members which cooperate with the stressed skin to take some of the loading so that the additional weight of the anti-icing arrangement becomes a minor factor limited to the diversion conduits and controls adjacent the engine and pilot.

It is accordingly an object of this invention to provide an improved wing construction wherein the wing covering is braced by an inner, spaced skin, a plurality of partitions connecting the inner and outer skins and dividing the space therebetween into a series of channels which can be used to conduct exhaust gases or heated air in contact with the inner side of the skin to heat the same for anti-icing purposes.

It is another object of this invention to provide an improved wing construction wherein a nose section is detachable as a unit from the main shear beam, and is constructed as a series of channels formed by longitudinal reinforcing strips or stringers which support the skin.

It is a further object of this invention to provide an improved wing anti-icing arrangement wherein engine exhaust gas can be diverted at will to flow through the leading edge or nose of the wing in contact with the inner surface of the wing covering or skin. When using exhaust gas as the heating agent it is advisable to so arrange the diversion valve that a backfire can find pressure relief through the usual exhaust system; and the spent exhaust gases can be discharged near the wing tip. A corollary advantage of so discharging the exhaust gases is that they are cooled below the illumination point so that the exhaust is not visible at night, a valuable feature for military missions.

It is also an object of this invention to provide an improved wing anti-icing arrangement wherein a wing nose construction of the type described can be used as an inter-cooler between a supercharger and the engine, and the passenger compartment in the case of a supercharged cabin. Supercharging the air adds heat thereto which it is desirable to remove in either case, and this heat is effective for anti-icing purposes.

Other and further important objects of this invention will be apparent from the disclosures in the specification and the accompanying drawings.

This invention in its preferred forms is illustrated in the drawings and hereinafter fully described.

In the drawings:

Figure I is a plan view, partly broken away, of an airplane wing embodying anti-icer ducts heated by engine exhaust gases.

Figure II is a fragmentary enlarged section on the line II—II of Figure I showing the nose or leading edge construction of the wing.

Figure III is a diagrammatic showing of the exhaust diversion system, under the pilot's control.

Figure IV is an enlarged fragmentary side view of the clapper valve shown on the exhaust tail pipe in Figure III.

Figure V is an enlarged side view of the double bell crank provided in the control linkage to release and open the clapper valve when the airplane is on the ground.

Figure VI is a plan view, partly broken away, wherein the anti-icer ducts are utilized as an intercooler between a supercharger and an engine of the airplane.

Figure VII is an enlarged fragmentary section on the line VII—VII of Figure VI, showing a wing nose construction similar to Figure II.

Figure VIII is an enlarged fragmentary section on the line VIII—VIII of Figure VI showing the return duct connecting the top and bottom anti-icer channels.

As shown:

In the illustrated embodiments of the invention a wing is built preferably upon skin stressed principles which utilize a main shear beam 11 in Figure I and 12 in Figure VI, together with transverse ribs 13 shown in dotted lines. In Figure I the main beam 11 is closer to the nose or leading edge of the wing than the beam 12 in Figure VI, but in either case the wing construction 14 back of the beam follows conventional practice and will not be described in detail herein. In both figures, a portion of an engine nacelle 15 is indicated, which would correspond to the fuselage in the case of a single engined airplane.

In the illustrated forms of the invention the nose portion of the wing; that part thereof ahead of the main beam, is a separate unit which is detachably fastened to the beam and the balance of the wing, in any suitable manner. The nose sections are very similar in the two forms of the invention, but will be described separately, since the second or intercooler form embodies both outgoing and return ducts and hence requires double the duct area for the same volume of air or gases. It will be evident however that either form of the invention could be used for exhaust gases, or as an intercooler, should it be so desired.

The nose section of Figures I and II comprises a skin 16 faired in with the rear section 14 of the wing, and detachably mounted on flanges 17 of the beam 11. Ribs 18 have their rear ends flanged and supported by the web of the beam, and their front ends support a vertical member 19 the top and bottom edges of which are formed to be riveted or otherwise fastened to the outer skin 16 to define a longitudinal duct 20. An inner covering 21 is applied to the ribs in spaced relationship to the outer skin 16, channel like stiffening members 22 dividing the space into longitudinal ducts 23. The structure formed by the skin 16, inner covering 21 and stiffening members 19 and 20 form a box beam 11.

When used for high temperature exhaust gases, the entire nose structure will be made of heat resisting material, and preferably, cooling air will be introduced into the interior of the inner covering 21, as by a rammed air inlet 24, the air circulating through lightening holes 25 in the ribs and being vented with the exhaust gases, or through a port or grill 26 near the outer end of the wing. If the ducts were to be used as an intercooler for supercharged air the cooled air could be returned through the central passage so formed, or a box type main beam could be used as a conduit if the added cooling duct area of Figure VI were not considered essential.

The exhaust gases from an engine are usually discharged through a tail pipe 27 adjacent the engine nacelle and wing surface, so that to divert the flow of exhaust gases to the anti-icer ducts 20 and 23 a clapper type valve 28 is applied to the normal tail pipe 27 and a by-pass passage 29 provided leading to one rib bay 30 which serves as a header box for the several ducts. At the outer end of the wing the ducts discharge into a common header passage 31 leading to the outer edge of the wing tip in a position to create suction on the outlet.

In order to control the use of exhaust gases for anti-icing purposes, a butterfly valve 32 is mounted in the by-pass passage 29 and interconnected with the clapper valve control in such a way as to insure that the by-pass valve 32 will be closed when the clapped valve 28 is open, and vice versa. A suitable control is shown in Figures III to V wherein a cockpit push and pull handle 33 may be engaged in any one of several notches in a bracket 34 and acts through normally interconnected double bell crank levers 35 and 36 to open the clapper valve 28 upon pushing down on the handle. Linkage 37 from the bell crank 36 to the clapper valve 28 includes a yielding connection 38 which allows the clapper valve to blow open should an explosion or backfire occur in the exhaust system. The separable bell crank levers 35 and 36, best shown in Figure V, normally act as a unit, being held together by a pin 39, which pin is arranged to be withdrawn by a solenoid 40, as a safety factor, to allow the clapper valve 28 to open. The solenoid may be energized by any of several conventional warning signals, such for example as the signal light circuit used to warn the pilot that the landing gear is extended; since it is inadvisable to subject the wing nose structure to exhaust heat while the airplane is on the ground and the wing is not exposed to the cooling air flow under flight conditions.

In the second illustrated embodiment of the invention shown in Figures VI, VII and VIII the main beam 12 supports a detachable nose section comprising an outer skin 41, a spaced inner skin 42 mounted on ribs 43, and channel like spacing members 44 forming ducts 45 as before described. The chief variation aside from size is that no nose duct corresponding to 20 of Figure II is provided for the reason that the ducts on one side of the ribs 43 form outgoing passages while the ducts on the other side form return passages. Outgoing and return header boxes 46 at the inboard ends of the ducts have connections 47, from the supercharger, and 48 to the engine respectively, and the outboard ends of the two sets of ducts are connected by a common return bend or header 49 in one of the rib bays.

It will thus be seen that I have invented an improved wing nose section that is structurally a load carrying member yet is adapted to conduct a heating fluid for anti-icing the wing or cooling the fluid.

Having thus described my invention and the present preferred embodiments thereof, I desire to emphasize the fact that many modifications may be resorted to in a manner limited only by a just interpretation of the following claims.

I claim:

1. A wing section of the single spar type having a main beam and a detachable nose section removably secured to said main beam, said nose section comprising spaced inner and outer skins having connections to the main beam common to both skins and beam to facilitate the removal of said nose section as a unit, transverse ribs supporting said inner skin, a plurality of longitudinal members supporting said outer skin from said inner skin and said ribs, and means for conducting a heating fluid through the spaces defined by said longitudinal members and said inner and outer skins, whereby to heat the outer skin for anti-icing purposes.

2. A wing section including a substantially vertical beam, a nose section secured to said beam comprising spaced inner and outer skins, transverse ribs supporting said inner skin, longitudinal members supporting said outer skin from said inner skin and said ribs, and means for conducting a heating fluid through the spaces defined by said longitudinal members and said inner and outer skins, whereby to heat the outer skin for anti-icing purposes, said conducting means including diverting means for exhaust gases and protective means for by-passing said diverting means in the event excessive pressures develop.

3. An airplane wing including a nose section having a covering, an inner skin substantially conforming to the shape of the covering but spaced therefrom and defining a central duct, a plurality of longitudinal members secured to both the covering and inner skin, said longitudinal members, skin and covering forming a substantial box like truss having a plurality of longitudinal ducts adapted to conduct a heating fluid in contact with the nose covering for anti-icing purposes, header means for introducing and removing a heated fluid into and from said longitudinal ducts and means for supplying a cooling fluid to said central duct whereby to prevent the transmission of heat to the interior of the wing.

4. In an engine powered airplane having a wing and an exhaust tail pipe, a by-pass passage communicating with said tail pipe, exhaust gas passages within said wing in communication with said by-pass passage interconnected valves associated within the tail pipe and by-pass passage for diverting the flow of exhaust gases through said by-pass passage and the exhaust gas passages in the wing, and control means for said interconnected valves including separate release means for opening the tail pipe valve upon a backfire in the exhaust system, and release means for opening the tail pipe valve when the airplane is not in flight.

5. In an engine powered airplane having a wing and an exhaust tail pipe, a by-pass passage communicating with said tail pipe, exhaust gas passages within said wing in communication with said by-pass passage, a valve associated with the tail pipe for diverting the flow of exhaust gases through said by-pass passage and the exhaust gas passages in the wing, and control means for said valve including release means for opening the tail pipe valve upon a backfire in the exhaust system.

6. In an engine powered airplane having a wing and an exhaust tail pipe, a by-pass passage communicating with said tail pipe, exhaust gas passages within said wing in communication with said by-pass passage, a valve associated with the tail pipe for diverting the flow of exhaust gases through said by-pass passage and the exhaust gas passages in the wing, and control means for said valve including release means for opening the tail pipe valve when the airplane is not in flight.

CLARENCE L. JOHNSON.